(12) United States Patent
Stanescu et al.

(10) Patent No.: US 10,520,002 B2
(45) Date of Patent: Dec. 31, 2019

(54) BARREL NUT WITH STRESS REDUCTION FEATURES

(71) Applicant: The Boeing Company, Chicago, IL (US)

(72) Inventors: Adrian Stanescu, Maple Valley, WA (US); Constantine Kostakis, Kirkland, WA (US); Michael Ronald Butcher, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 15/671,513

(22) Filed: Aug. 8, 2017

(65) Prior Publication Data

US 2017/0363132 A1    Dec. 21, 2017

Related U.S. Application Data

(62) Division of application No. 14/469,640, filed on Aug. 27, 2014, now Pat. No. 9,759,251.

(51) Int. Cl.
*F16B 31/06* (2006.01)
*F16B 37/04* (2006.01)
*B23G 9/00* (2006.01)

(52) U.S. Cl.
CPC ............... *F16B 31/06* (2013.01); *B23G 9/006* (2013.01); *F16B 37/047* (2013.01)

(58) Field of Classification Search
CPC ......... F16B 31/06; F16B 37/047; B23G 9/006
See application file for complete search history.

(56) References Cited

U.S. PATENT DOCUMENTS

| 3,021,162 | A | 2/1926 | Jahn |
| 2,688,355 | A | 6/1952 | Forster |
| 3,208,496 | A | 6/1963 | Phelan |
| 3,205,927 | A | 2/1964 | Phelan |
| 3,322,177 | A | 8/1965 | Phelan |
| 4,119,130 | A | 10/1978 | Berecz |
| 4,861,207 | A | 8/1989 | Do |
| 4,886,407 | A | 12/1989 | Harbin |
| 5,779,412 | A | 7/1998 | Nagai et al. |
| 8,142,123 | B2 | 3/2012 | Holscher |

(Continued)

OTHER PUBLICATIONS

Examination Report No. 1 for standard patent application No. 2015202597, Australian Government, IP Australia, dated Jul. 31, 2018.

(Continued)

*Primary Examiner* — John C Hong
(74) *Attorney, Agent, or Firm* — Ostrager Chong Flaherty & Broitman PC

(57) ABSTRACT

A barrel nut with features for reducing tensile stresses under heavy load within the barrel nut has a partial-cylindrical body having a first planar end surface and a second planar end surface. A threaded bore extends through the partial-cylindrical body with a central axis substantially parallel to the first planar end surface and the second planar end surface. At least one groove is formed in each of the first planar end surface and the second planar end surface, the groove having a rounded surface extending at least a part of a distance between a curved upper surface of the partial-cylindrical body to a bottom surface thereof in a direction substantially parallel to the central axis of the threaded bore.

20 Claims, 7 Drawing Sheets

(56) References Cited

U.S. PATENT DOCUMENTS

2010/0244342 A1    9/2010  Zander

OTHER PUBLICATIONS

Printouts from http://www.shur-lok.com/ and http://www.shur-lok.com/solutions/barrel/... showing barrel nuts, printed Jun. 26, 2014.
Printouts from http://www.theharwarehut.com/catalog-product-specs.php?p_ref=302759, showing Selby 3/4" Steel Barrel Nut, printed Jun. 26, 2014.
Search Report dated Jun. 2, 2016 in related Canadian Patent Application No. 2,892,721.
Examination Report from the Patent Office of the Cooperation Council for the Arab States of the Gulf, in related application No. GC 2015-29928, dated Jan. 28, 2019.

BARREL NUT WITH STRESS REDUCTION FEATURES

RELATED PATENT APPLICATION

This application is a divisional of and claims priority from U.S. patent application Ser. No. 14/469,640 filed on Aug. 27, 2014.

TECHNICAL FIELD

This disclosure generally relates to barrel nuts and more particularly to barrel nuts adapted for attaching heavy structural members in high-tensile applications.

BACKGROUND

In general, a nut is a type of fastener with a threaded hole extending through the fastener that is mated with a bolt having an exterior thread to fasten two or more parts together. The combination of the friction between the nut threads and the bolt threads, a slight stretch of the bolt, and compression of the parts holds the parts together. The bolt is under a constant tensile stress called the preload. The preload pulls the nut threads against the bolt threads, and the nut face against a bearing surface of one of the parts, with a constant force, so that the nut cannot rotate without overcoming the friction between these surfaces. In many applications, nut-and-bolt joints are subjected to vibration, which if intense enough, can cause the preload to increase and decrease with each vibration cycle, and may cause the nut to become loose, crack or rupture.

Barrel nuts are specialized nuts, commonly used in aerospace, automobile and other applications that require high torque to bolt parts together, such as hanging aircraft engines from wings and attaching wings or tails to an aircraft fuselage, or in applications where access to the nut is limited. A barrel nut is typically shaped like a round slug or a cylinder. Some barrel nut designs incorporate a partially 'flattened' surface to form, for example, a semi-cylindrical cross section. Barrel nuts have a threaded hole extending through the slug in a direction perpendicular to the length of the slug. In use, barrel nuts typically sit inside a hole through a first part and a bolt is threaded into the barrel nut from outside, passing through the second part that is to be bolted to the first part. Barrel nuts are preferred over a standard nut and bolt, when access is limited or not available, because they do not require any modification of the second part or additional materials, thus reducing weight and providing manufacturing and service efficiencies.

An exemplary aircraft field of use for a barrel nut is shown in FIGS. 1A and 1B. An aircraft engine mount 10 is employed to attach an aircraft engine 12 to a strut 14 in an aircraft wing (not shown). The engine mount 10 is a structural element having cylindrical bores 16 extending through the engine mount 10 in a horizontal direction with a central axis H. Bolt holes 20 are positioned through a top surface 22 of the engine mount such that the bolt holes 20 extend into the cylindrical bores 16 with a central axis V perpendicular to the central axis H of the cylindrical bores 16. Barrel nuts 18 are positioned within the cylindrical bores 16 in alignment with the bolt holes 20 to receive bolts 24, which may extend through holes in the strut 14 to attach the strut 14 to the engine mount 10. Once inserted into the cylindrical bores 16, access to the barrel nut 18 is limited. In use, when load is applied, the barrel nut 18 is exposed to stresses from the weight of the engine 12 and movement/flight of the aircraft.

SUMMARY

An improved barrel nut with features for reducing tensile stresses within the barrel nut during use is disclosed. The improvements eliminate cracking of the barrel nut under heavy load applications in areas around a threaded hole in the barrel nut, and therefore eliminate the need to use larger diameter bolts and barrel nuts to accommodate heavy loads and expensive re-design of mounting structures to accommodate larger diameter barrel nuts for such applications.

The improved barrel nut comprises a partial-cylindrical body having a first planar end surface and a second planar end surface and a threaded bore extending through the partial-cylindrical body with a central axis substantially parallel to the first planar end surface and the second planar end surface. Each of the first planar end surface and the second planar end surface comprises at least one groove with a rounded surface extending at least a part of a distance between a curved upper surface of the partial-cylindrical body to a non-curved bottom surface thereof in a direction substantially parallel to the central axis of the threaded bore.

In a first embodiment, the at least one groove in each of the first planar end surface and the second planar end surface is aligned with the central axis of the threaded bore such that the at least one groove is positioned on a center line of each of the first planar end surface and the second planar end surface. In a second embodiment, each of the first planar end surface and the second planar end surface comprises two grooves extending in a direction substantially parallel to the central axis, and positioned equidistant from a center line of each of the first planar end surface and the second planar end surface, the center line being aligned with the central axis of the threaded bore. In other embodiments, additional grooves may be added to each of the first planar end surface and the second planar end surface, and configured in other arrangements to provide stress reduction features.

In all embodiments, the bottom surface of the partial-cylindrical body comprises a flange surrounding the threaded bore. The flange is raised above the bottom surface and extends from a circumferential edge of the threaded bore to a side edge of the bottom surface of the partial-cylindrical body such that the curved upper surface of the partial-cylindrical body extends below the bottom surface in a central area having a length substantially equal to a diameter of the threaded bore to provide additional strength and stress-reduction features around the threaded bore. In addition, the length of the threads in the threaded bore extends from the bottom surface to a point below the curved upper surface of the partial-cylindrical body such that a distance between the point and the curved upper surface is about 2% to about 10% of a total length of the threads.

Related methods of making a barrel nut with stress reducing features are also considered to be within the scope of the present disclosure. Other objects, features, and advantages of the various embodiments in the present disclosure will be explained in the following detailed description with reference to the appended drawings.

DETAILED DESCRIPTION

Figure 1A:
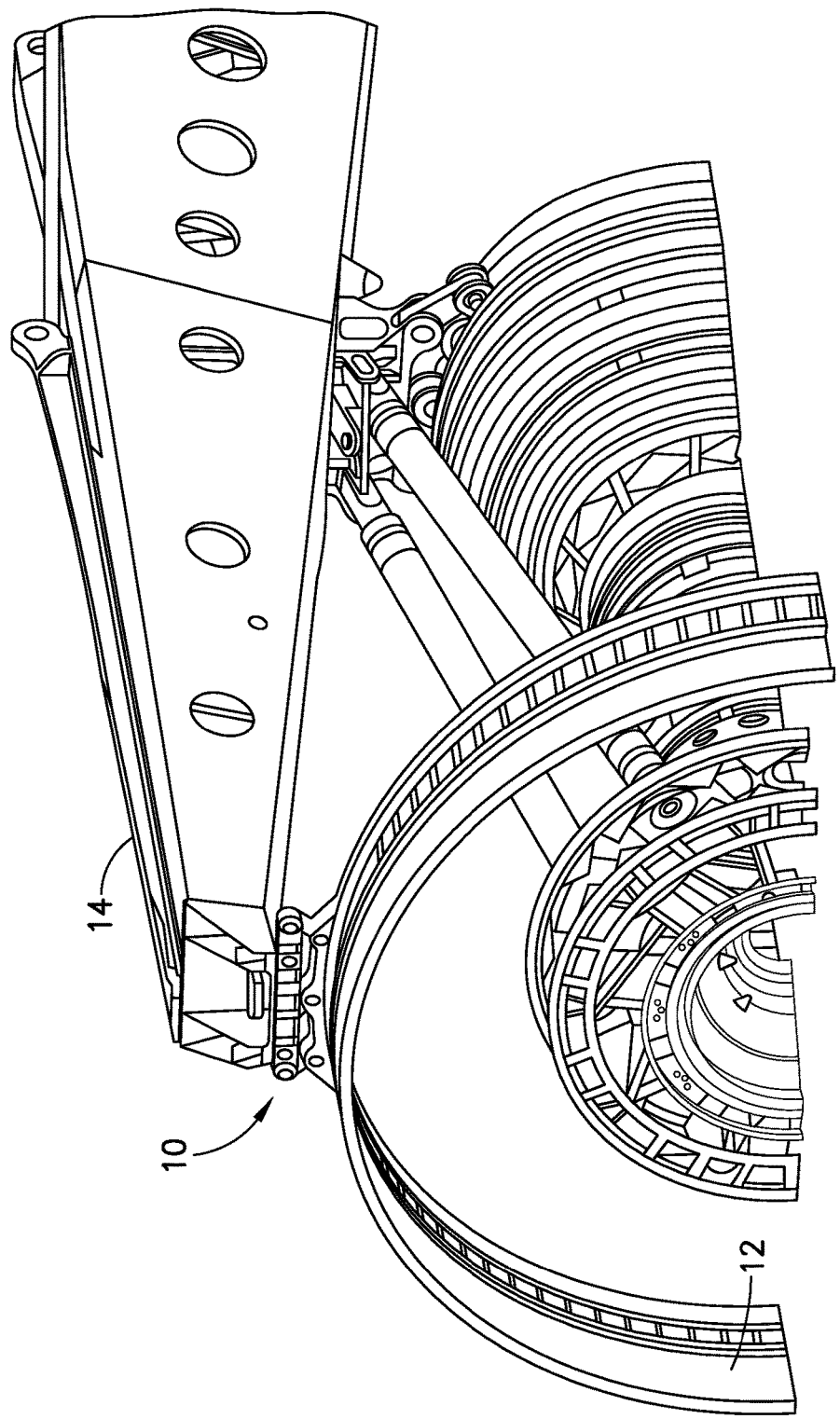
FIG. 1A illustrates an exemplary aircraft environment of use in which the improved barrel nut may be used.
Figure 1B:
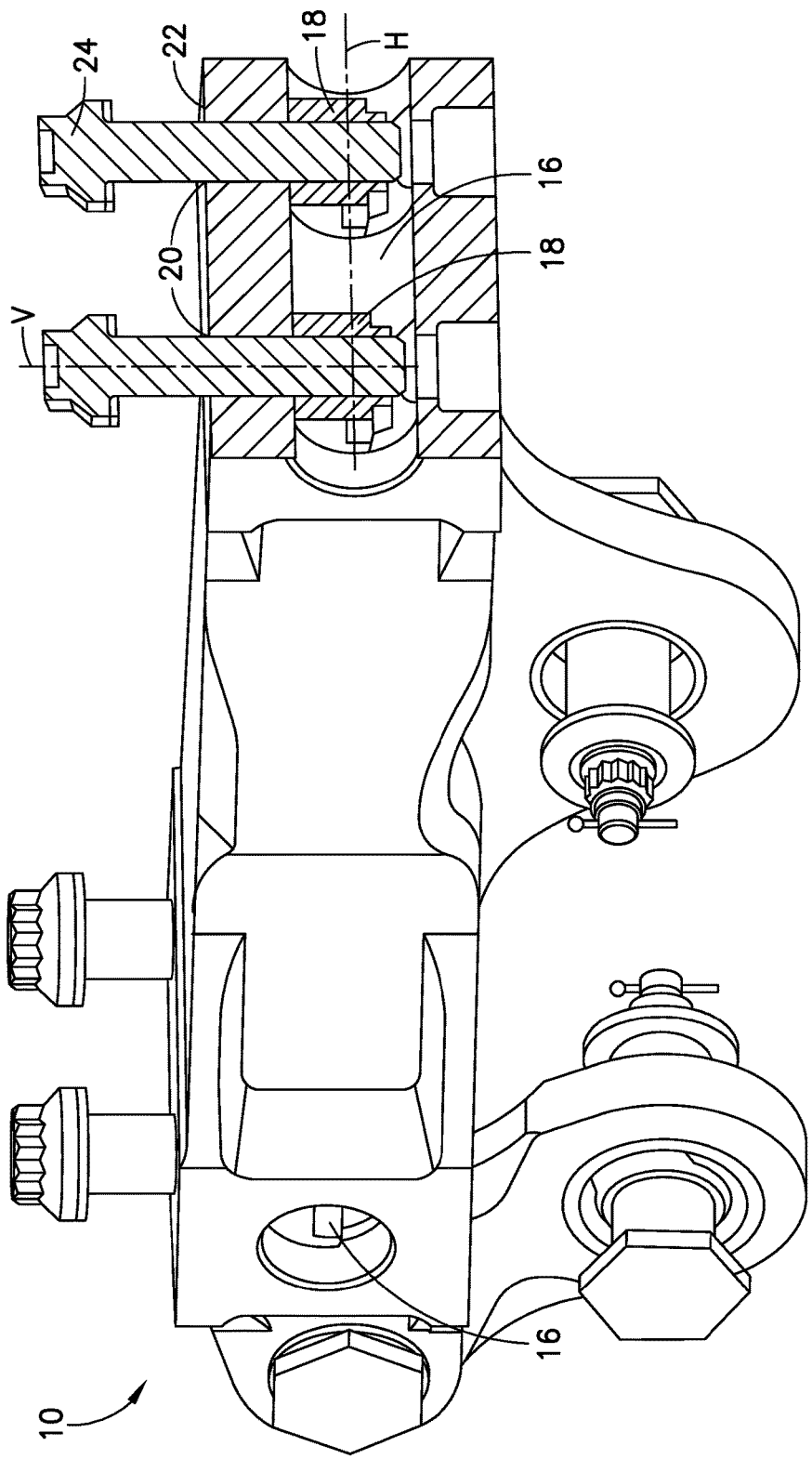
FIG. 1B illustrates an engine mount in the exemplary aircraft environment of FIG. 1 in which the improved barrel nut may be used.

In the following detailed description, various embodiments are described to illustrate the general principles in the present disclosure. It will be recognized by one skilled in the art that the present disclosure may be practiced in other analogous applications or environments and/or with other analogous or equivalent variations of the illustrative embodiments. For example, the improved barrel nut may be used in any application or industry that requires high torque to bolt parts together and the ability to withstand stresses from heavy loads. It should also be noted that those methods, procedures, components, or functions which are commonly known to persons of ordinary skill in the field of the disclosure are not described in detail herein.

Several embodiments of the improved barrel nut 30 are shown in FIGS. 2A-2B, FIGS. 3A-3C, FIG. 4 and FIG. 5, respectively. The improved barrel nut 30 comprises a partial-cylindrical body 32 having a first planar end surface 34 and a second planar end surface 36, an curved upper surface 38 and a non-curved bottom surface 40 that is substantially flattened. A threaded bore 42 having a diameter 31 extends through the partial-cylindrical body 32, from the curved upper surface 38 to the bottom surface 40. The threaded bore 42 has a central axis 44 substantially parallel to the planes of the first planar end surface 34 and the second planar end surface 36.

The barrel nuts 30 have a one-piece construction formed from metals, metal alloys, steel or other materials depending on the intended application. A preferred material is nickel alloy. The barrel nuts 30 may also be made from corrosion and/or heat resistant materials, or have surface finishes with protective features. For example, a solid film lubricant coating may be applied inside the threaded bore 42 to coat the entire thread and to the curved upper surface 38 and bottom surface 40 to preclude galling by reducing friction between metal to metal contacts, prevent corrosion, and allow repeated assembly/disassembly of the barrel nut joint. Examples of specifications for such solid film lubricants are disclosed in the U.S. Military Specification MIL-PRF-46010G, "Lubricant, Solid Film, Heat Cured, Corrosion Inhibiting," NATO Code—S-1738, Aug. 10, 2000.

To reduce stresses in the partial-cylindrical body 32 around the threaded bore 42, and to avoid cracks in the curved upper surface 38 near the threaded bore 42, each of the first planar end surface 34 and the second planar end surface 36 comprises one or more grooves 46 extending in a direction substantially parallel to the central axis 44 of the threaded bore 42. Because the partial-cylindrical body 32 is symmetrical and the threaded bore is positioned in the center of the partial-cylindrical body 32, it is preferred that the number and position of grooves 46 in the first planar end surface 34 is the same as the number and position of grooves 46 in the second planar end surface 36.

Figure 4:
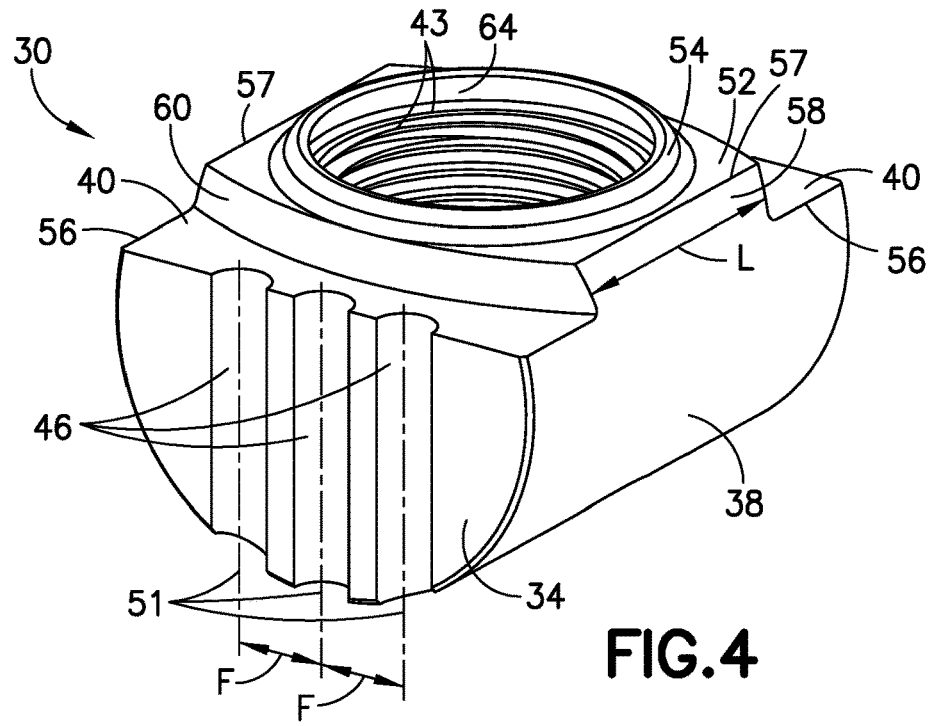
FIG. 4 illustrates a bottom, left end and rear perspective view of an alternative embodiment of the improved barrel nut.
Figure 5:
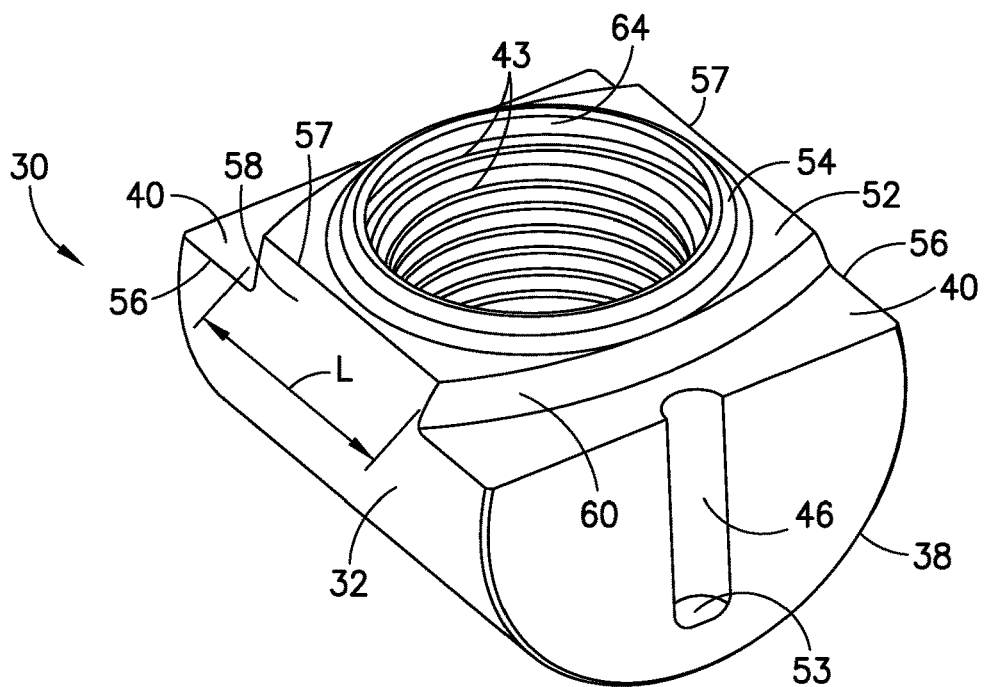
FIG. 5 illustrates a bottom, right end and rear perspective view of another alternative embodiment of the improved barrel nut.
Figure 6:
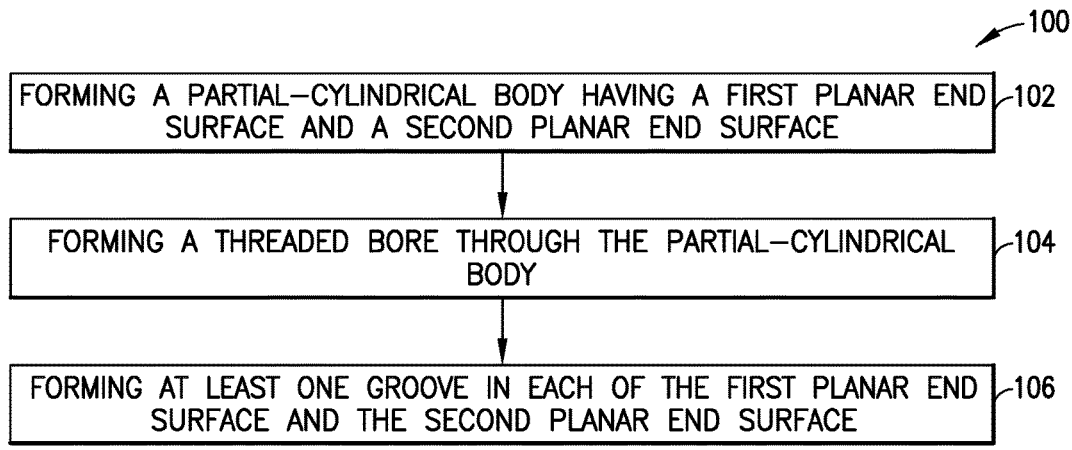
FIG. 6 illustrates the steps of a method of reducing stress in a barrel nut.

The grooves 46 should extend at least part of the distance between the curved upper surface 38 and the bottom surface 40 of the partial-cylindrical body 32. The grooves 46 may extend from the curved upper surface 38 of the partial-cylindrical body 32 all the way to the bottom surface 40 thereof, as shown in FIGS. 2A-2B, FIGS. 3A-3C and FIG. 4. Alternatively, the grooves 46 may extend only part of the depth of the partial-cylindrical body 32 from either the curved upper surface 38 or from the bottom surface 40. FIG. 5 shows an example of a barrel nut 30 having a groove 46 extending from the bottom surface 40 only partially into the partial-cylindrical body 32. The groove 46 may end at an inner end point 53 between the curved upper surface 38 and the bottom surface 40. The inner end point is rounded with a radius equal to or greater than the radius of the groove 46, as described below.

Each of the grooves 46 preferably has a rounded surface, which may have a circular or oval shape. If an oval shape is used, the oval may be positioned either vertically or horizontally.

The grooves 46 preferably have a smooth surface with a generous radius to minimize stresses in the partial-cylindrical body 32. The radius R of the grooves 46 is a function of the diameter D of the barrel nut 30. See FIG. 3C. The radius R is generally in the range of about 0.015 times the diameter D to about 0.15 times the diameter D (i.e., 0.015*D to 0.15*D).

Figure 2A:
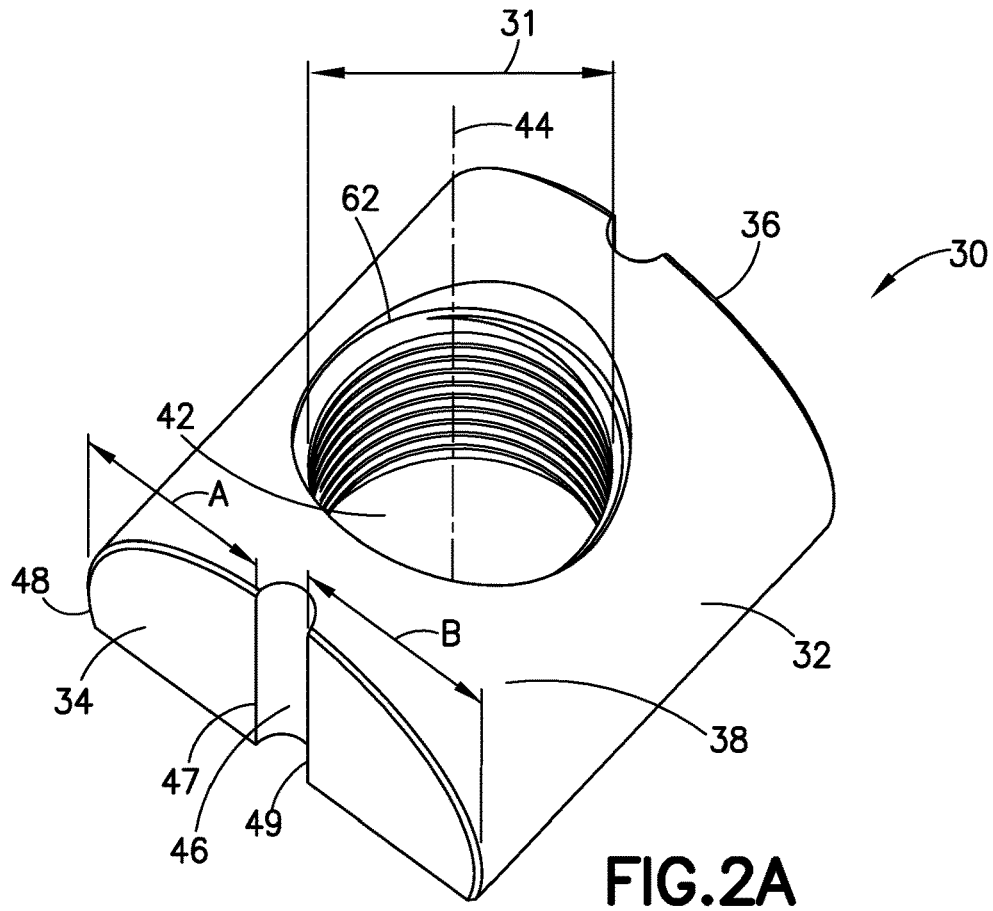
FIG. 2A illustrates a top, left end and front perspective view of a first embodiment of the improved barrel nut.
Figure 2B:
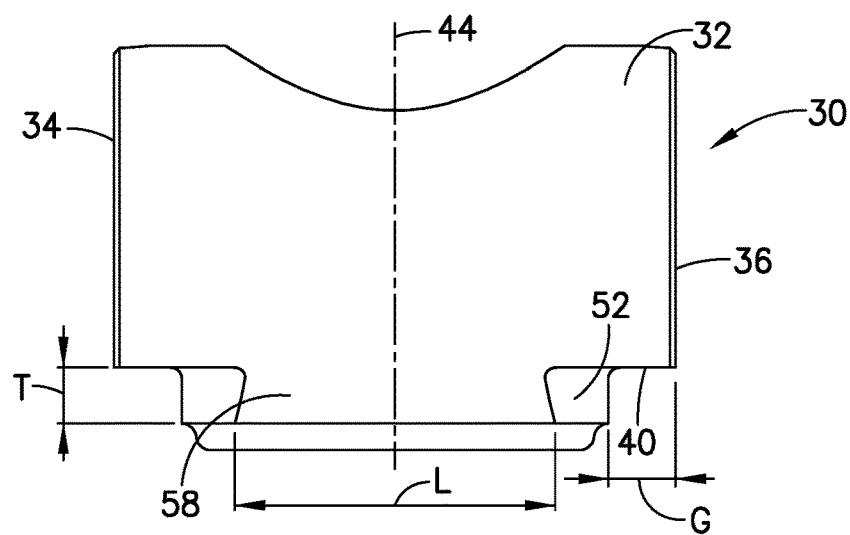
FIG. 2B illustrates a front plan view of the improved barrel nut shown in FIG. 2A.

In a first embodiment of the barrel nut 30 shown in FIG. 2A and FIG. 2B, a single groove 46 in each of the first planar end surface 34 and the second planar end surface 36 is aligned with the central axis 44 of the threaded bore 42 such that the single groove 46 is positioned in the middle of the first planar end surface 34 and in the middle of the second planar end surface 36. That is, a first horizontal distance A between a first edge 47 of the single groove 46 and an outer edge 48 of the curved upper surface 38 is equal to a second horizontal distance B between a second edge 49 of the groove 46 and the outer edge 48. The middle of the first planar end surface 34 and the middle of the second planar end surface 36 is also identified as the center line 50 shown in FIG. 3B.

Figure 3A:
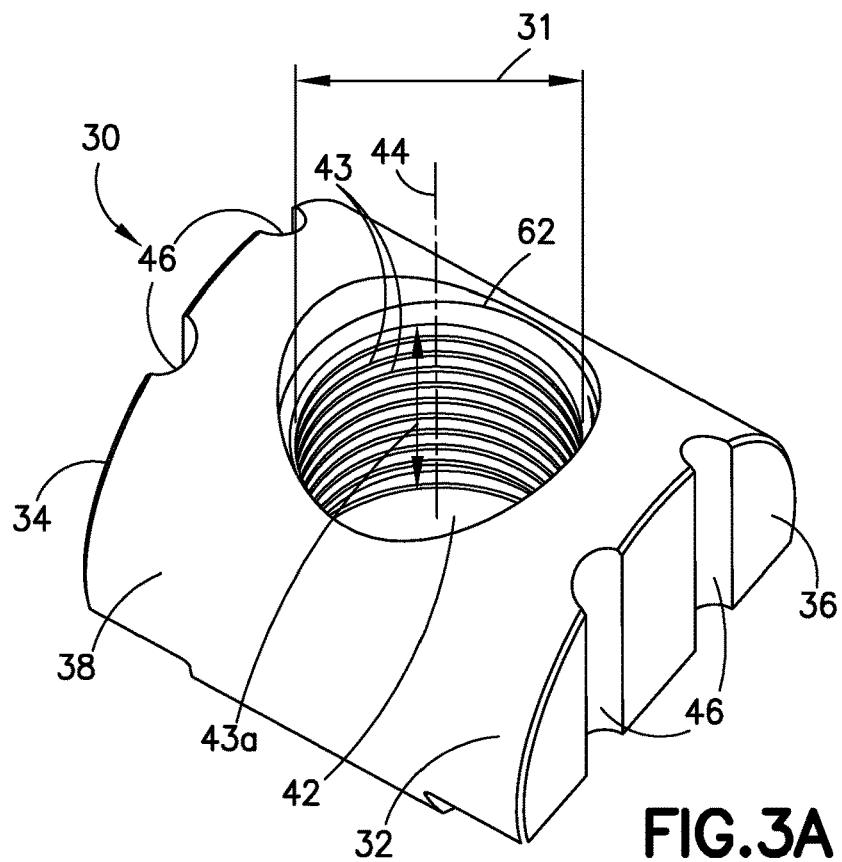
FIG. 3A illustrates a top, right end and front perspective view of a second embodiment of the improved barrel nut.
Figure 3B:
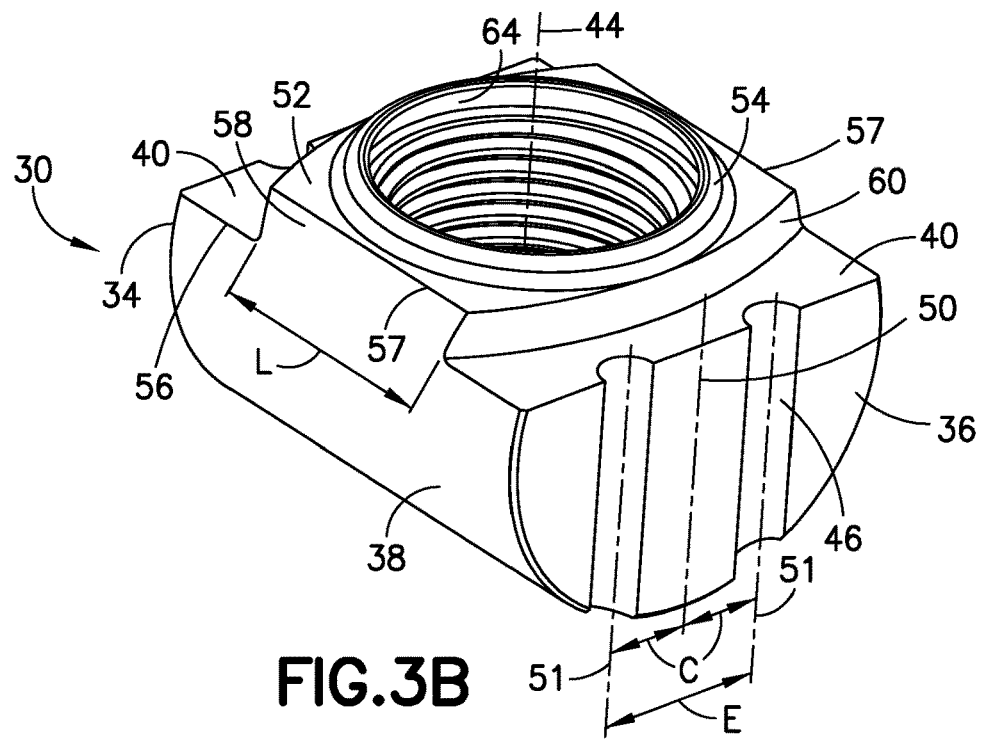
FIG. 3B illustrates a bottom, right end and rear perspective view of the barrel nut shown in FIG. 3A.
Figure 3C:
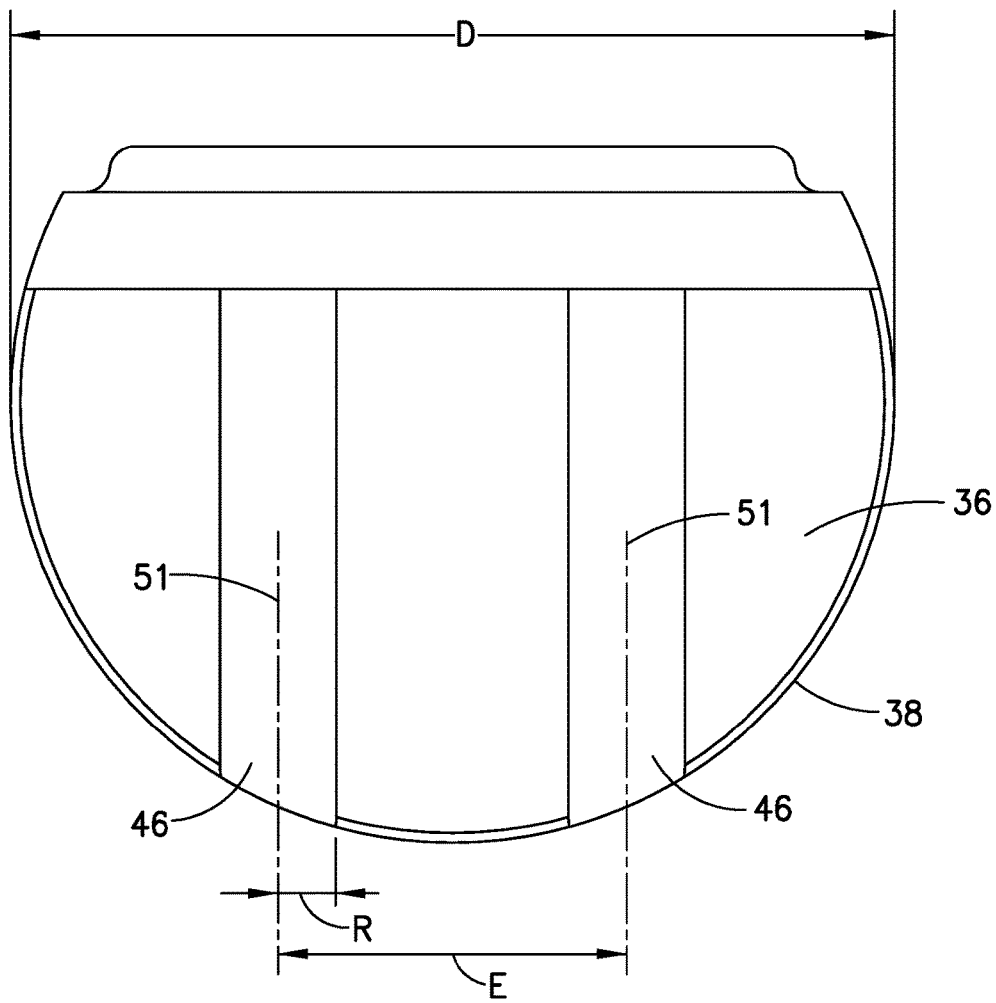
FIG. 3C illustrates a right end plan view of the barrel nut shown in FIG. 3A.

A second embodiment of the barrel nut 30 having two grooves 46 in each of the first planar end surface 34 and the second planar end surface 36 is shown in FIG. 3A-3C. As in the first embodiment, the grooves 46 extend in a direction substantially parallel to the central axis 44 of the threaded bore 42 from the curved upper surface 38 to the bottom surface 40. But, in this embodiment, the grooves 46 are positioned equidistant from a center line 50 in the middle of each of the first planar end surface 34 and the second planar end surface 36. The center line 50 is aligned with the central axis 44 of the threaded bore 42. That is, a horizontal distance C between a center 51 of each of the grooves 46 and the center line 50 is equal. Since the partial-cylindrical body is symmetrical, the horizontal distance C on each side of the center line 50 may be any distance provided the horizontal distance C on each side of the center line 50 is substantially equal. In the second embodiment, the distance between the threaded bore 42 and the grooves 46 is greater than in the first embodiment. The preferred distance E between the centers 51 of each of the grooves 46 is a function of the diameter D of the barrel nut 30. The distance E is generally in the range of about 0.25 times the diameter D to about 0.5 times the diameter D (i.e., 0.25*D to 0.5*D).

In other embodiments, additional grooves 46 may be added to each of the first planar end surface 34 and the second planar end surface 36, and configured in other arrangements to provide stress reduction features. For example, referring to FIG. 4, three grooves 46 may be provided in the first planar end surface 34 and the second planar end surface 36. Each of the three grooves 46 may have a radius R that is the same or the central groove may be provided with a small radius and the two outer grooves may be provided with larger radii. The radii R of the grooves in this embodiment are also a function of the diameter D of the barrel nut 30, and may be in the range of about 0.015*D to about 0.15*D. The preferred distance F between the centers 51 of each of the grooves 46 in this embodiment is also a function of the diameter D of the barrel nut 30. The distance F is generally in the range of about 0.125 times the diameter D to about 0.25 times the diameter D (i.e., 0.125*D to 0.25*D).

In other embodiments, such as the single groove embodiment shown in FIGS. 2A-2B, the groove 46 may be formed with a smaller radius R to provide a larger distance between the groove 46 and the threaded bore 42.

The bottom surface 40 of the partial-cylindrical body 32 in all embodiments preferably comprises a flange 52 surrounding the threaded bore 42, which adds more material near the center of the partial-cylindrical body 32 to increase the strength of the barrel nut 30 and to prevent the barrel nut 30 from rotating. The flange 52 increases inertia and therefore the bending capability of the barrel nut 30 at the location of maximum bending stress—in the curved upper surface 38 near the threaded bore 42. It is preferred to add enough material to increase strength without substantially increasing the weight of the barrel nut 30.

The flange 52 is raised above the bottom surface 40 and extends from a circumferential edge 54 of the threaded bore 42 to a side edge 56 of the bottom surface 40 of the partial-cylindrical body 32, such that the curved upper surface 38 of the partial-cylindrical body 32 extends below the bottom surface 40 in a central area 58. Referring to FIGS. 3B, 4 and 5, the central area 58 of the curved upper surface 38 below the bottom surface 40 has a length L substantially equal to a diameter of the threaded bore 42 to provide additional strength and stress-reduction features around the threaded bore 42. The flange 52 extends around the entire circumference of the threaded bore 42, and has two straight edges 57 at the side edges 56 of the bottom surface 40 and two curved edges 60 facing the first planar end surface 34 and the second planar end surface 36. Referring to FIG. 2B, the flange thickness T and the distance G between the flange and each of the first planar end surface 34 and the second planar end surface 36 are a function of the diameter D of the barrel nut 30. The flange thickness T is between about 0.05*D to about 0.10*D. The distance G is between about 0.036*D to about 0.1*D. The radius of curvature of the curved edges 60 is also a function of the diameter D of the barrel nut 30, and is preferably in the range of about 0.87*D to about 1.46*D.

The threaded bore 42 comprises a plurality of threads 43 having a total length 43a extending from the bottom surface 40 to a point 62 below the curved upper surface 38 of the partial-cylindrical body 32. See FIGS. 2A and 3A. The distance between the point 62 and the curved upper surface 38 is preferably about 2% to about 10% of the total length of the threads.

Referring to FIGS. 3B, 4 and 5, a nylon or polymide lockring 64 may be provided between the threads 43 and the bottom of the threaded bore 42 in the area of the flange 52.

The barrel nut 30 disclosed herein reduces peak stress below the yield or deformation limit ("Fty") for the highest expected preload. The grooves 46 in the barrel nut 30 effectively move the peak stress locations away from the curved upper surface 38 near the top of the threaded bore 42. Stress analysis tests performed on a baseline barrel nut without the stress reduction features disclosed herein and the barrel nut 30 with the disclosed stress reduction features show that the stress reduction features in barrel nut 30 reduce stress in the curved upper surface 38 near the threaded bore 42 by about 15%.

Figure 7:
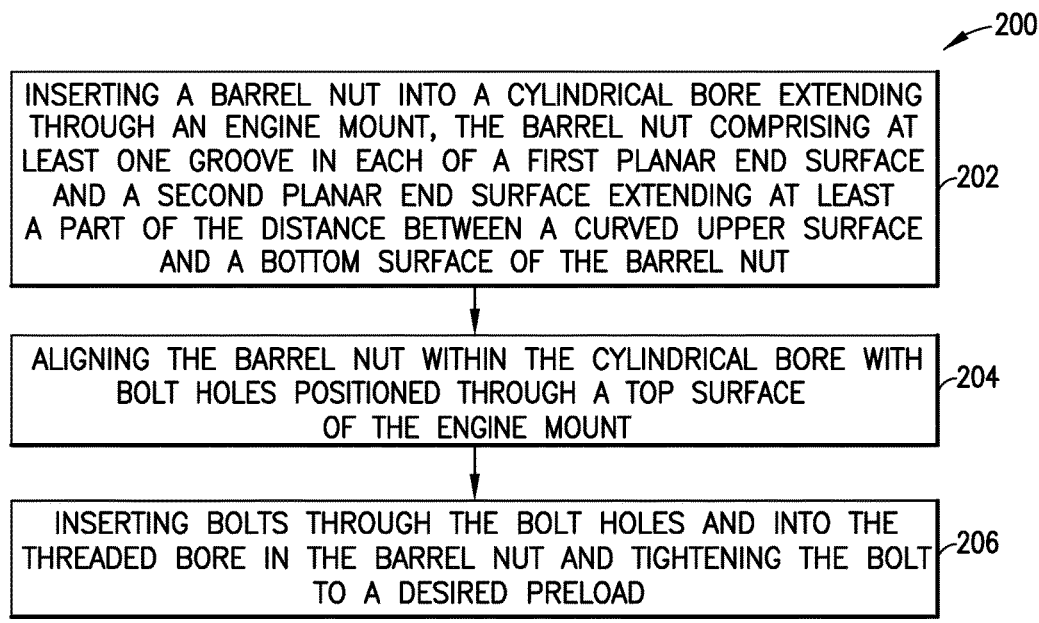
FIG. 7 illustrates the steps of a method of mounting an aircraft engine onto an aircraft using the improved barrel nut.

Methods of reducing stress in a barrel nut and mounting an aircraft engine onto an aircraft are shown in FIGS. 7 and 8, respectively. The method of reducing stress 100 comprises the steps 102, 104 of forming a barrel nut 30 comprising a partial-cylindrical body 32 having a first planar end surface 34 and a second planar end surface 36 and the step 104 of forming a threaded bore 42 extending through the partial-cylindrical body 32 with a central axis 44 substantially parallel to the first planar end surface 34 and the second planar end surface 36. In step 106, at least one groove 46 is formed in each of the first planar end surface 34 and the second planar end surface 36. The at least one groove 46 has a rounded surface extending at least a part of the distance between a curved upper surface 38 of the partial-cylindrical body 32 and a bottom surface 40 thereof in a direction substantially parallel to the central axis 44 of the threaded bore 42.

The method 200 for mounting an aircraft engine to an aircraft comprises the step 202 of inserting a barrel nut 30, comprising a partial-cylindrical body 32 having a first planar end surface 34 and a second planar end surface 36, a threaded bore 42 extending through the partial-cylindrical body 32, and at least one groove 46 in each of the first planar end surface 34 and the second planar end surface 36 extending at least a part of a length of the partial-cylindrical body 32 in a direction substantially parallel to a central axis 44 of the threaded bore 42, into a cylindrical bore 16 extending through an engine mount 10. In step 204, the barrel nut 30 is aligned within the cylindrical bore 16 with bolt holes 20 positioned through a top surface 22 of the engine mount 10. In step 206, bolts 26 are inserted through the bolt holes 20 and into the threaded bore 42 in the barrel nut 30, and tightened to the desired preload.

Many other modifications and variations may of course be devised given the above description of various embodiments for implementing the principles in the present disclosure. It is intended that all such modifications and variations be considered as within the spirit and scope of this disclosure, as defined in the following claims.

The invention claimed is:

1. A method of reducing stress in a barrel nut comprising:
forming a one-piece partial-cylindrical body having a first planar end surface and a second planar end surface;

forming a threaded bore through the partial-cylindrical body with a central axis substantially parallel to the first planar end surface and the second planar end surface; and forming at least one groove recessed into each of the first planar end surface and the second planar end surface extending at least a part of a length of the partial-cylindrical body in a direction substantially parallel to the central axis of the threaded bore.

2. The method of claim 1, further comprising forming the at least one recessed groove to have a rounded surface.

3. The method of claim 2, wherein the rounded surface has a radius in the range of about 0.015 to 0.15 times a diameter of the barrel nut.

4. The method of claim 1, further comprising aligning the at least one recessed groove in each of the first planar end surface and the second planar end surface with the central axis of the threaded bore such that the at least one recessed groove is positioned on a center line in each of the first planar end surface and the second planar end surface.

5. The method of claim 1, further comprising forming two grooves in each of the first planar end surface and the second planar end surface to extend in a direction substantially parallel to the central axis from a curved upper surface to a bottom surface of the partial-cylindrical body.

6. The method of claim 5, further comprising positioning the two grooves equidistant from a center line of each of the first planar end surface and the second planar end surface, the center line being aligned with the central axis.

7. The method of claim 6, wherein a distance between a center line of each of the two grooves is in a range of about 0.25 to 0.5 times a diameter of the barrel nut.

8. The method of claim 1, further comprising forming in a bottom surface of the partial-cylindrical body a flange surrounding the threaded bore, the flange being raised above the bottom surface and extending from a circumferential edge of the threaded bore to a side edge of the bottom surface.

9. The method of claim 8, wherein the flange at the side edge extends a curved upper surface of the partial-cylindrical body below the bottom surface in a central area, the central area having a length substantially equal to a diameter of the threaded bore.

10. A method of mounting an aircraft engine to an aircraft, comprising the steps of:

inserting a barrel nut into a cylindrical bore extending through an aircraft engine mount, the barrel nut comprising a one-piece partial-cylindrical body having a first planar end surface and a second planar end surface, a threaded bore extending through the partial-cylindrical body and at least one groove recessed into each of the first planar end surface and the second planar end surface extending at least a part of a distance between a curved upper surface of the partial-cylindrical body and a bottom surface of the partial-cylindrical body in a direction substantially parallel to a central axis of the threaded bore;

aligning the barrel nut within the cylindrical bore with bolt holes positioned through a top surface of the aircraft engine mount;

inserting bolts through the bolt holes and into the threaded bore in the barrel nut; and tightening the bolts.

11. A method of reducing stress in a barrel nut comprising:

forming a partial-cylindrical body having a first planar end surface and a second planar end surface;

forming a threaded bore through the partial-cylindrical body with a central axis substantially parallel to the first planar end surface and the second planar end surface;

forming at least one groove recessed into each of the first planar end surface and the second planar end surface extending at least a part of a length of the partial-cylindrical body in a direction substantially parallel to the central axis of the threaded bore; and forming in a bottom surface of the partial-cylindrical body a flange surrounding the threaded bore, the flange being raised above the bottom surface and extending from a circumferential edge of the threaded bore to a side edge of the bottom surface.

12. The method of claim 11, wherein the flange at the side edge extends a curved upper surface of the partial-cylindrical body below the bottom surface in a central area, the central area having a length substantially equal to a diameter of the threaded bore.

13. The method of claim 11, further comprising forming the at least one groove to have a rounded surface recessed into each of the first planar end surface and the second planar end surface.

14. The method of claim 13, wherein the rounded surface has a radius in a range of about 0.015 to 0.15 times a diameter of the barrel nut.

15. The method of claim 11, further comprising aligning the at least one groove in each of the first planar end surface and the second planar end surface with the central axis of the threaded bore such that the at least one groove is positioned on a center line in each of the first planar end surface and the second planar end surface.

16. The method of claim 11, further comprising forming two grooves in each of the first planar end surface and the second planar end surface to extend in a direction substantially parallel to the central axis from a curved upper surface to the bottom surface of the partial-cylindrical body.

17. The method of claim 16, further comprising positioning the two grooves equidistant from a center line of each of the first planar end surface and the second planar end surface, the center line being aligned with the central axis.

18. The method of claim 16, wherein a distance between a center line of each of the two grooves is in a range of about 0.25 to 0.5 times a diameter of the barrel nut.

19. The method of claim 11, further comprising forming the flange with a thickness between about 0.05 to about 0.10 times a diameter of the barrel nut.

20. The method of claim 11, further comprising forming the threaded bore with a plurality of threads having a total length extending from the bottom surface to a point below a curved upper surface of the partial-cylindrical body.

* * * * *